No. 847,969. PATENTED MAR. 19, 1907.
A. C. POWERS.
KITCHEN IMPLEMENT.
APPLICATION FILED MAY 5, 1906.
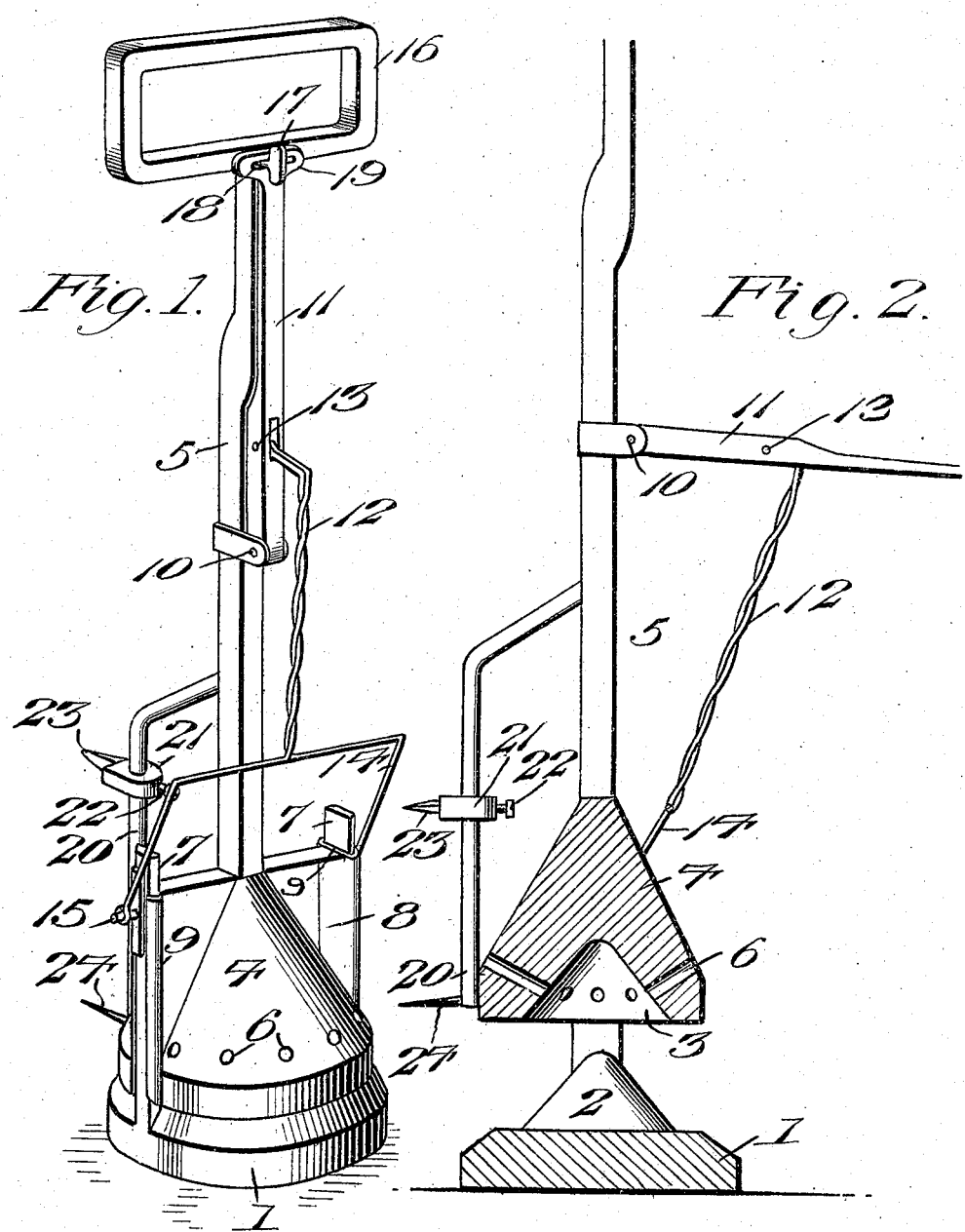
Witnesses
Inventor
A. C. Powers,
By Victor J. Evans
Attorney

UNITED STATES PATENT OFFICE.

ALEXANDER C. POWERS, OF LOUISVILLE, KENTUCKY.

KITCHEN IMPLEMENT.

No. 847,969.

Specification of Letters Patent.

Patented March 19, 1907.

Application filed May 5, 1906. Serial No. 315,392.

*To all whom it may concern:*

Be it known that I, ALEXANDER C. POWERS, a citizen of the United States, residing at Louisville, in the county of Jefferson and State of Kentucky, have invented new and useful Improvements in Kitchen Utensils, of which the following is a specification.

This invention relates to kitchen utensils; and the object in view is to provide a combination article for general use in kitchens, embodying means for opening cans, squeezing lemons, mashing potatoes, and similar operations.

Another object of the invention is to so combine the parts of the device that they will not interfere with each other or impair the usefulness of the article when such article is used for any specific purpose.

With the above and other objects in view the invention consists in the novel construction, combination, and arrangement of parts hereinafter more fully described, illustrated, and claimed.

In the drawings, Figure 1 is a perspective view of the utensil adjusted for use as a potato-masher and can-opener. Fig. 2 is a vertical longitudinal section through the same, showing the manner in which the device is used for squeezing lemons.

Referring to the drawings, 1 designates the base of the utensil, which has a flat lower surface to be used as a potato-mashing head and a slotted squeezing-cone 2, extending upward from the base and adapted to enter a corresponding cavity 3 in a superimposed shell member 4, of conical shape, mounted upon and carried by the stock or shank 5 of the implement.

The shell member 4 is provided with a circular series of discharge-openings 6, extending entirely around the same and opening out radially therethrough and also preferably inclined, as shown in Fig. 2, said openings allowing the juice squeezed from the lemon to escape.

In order to provide for operating the lemon-squeezer, the base 1 is provided at diametrically opposite points with upstanding guides 7, preferably of dovetailed shape in cross-section or provided with reversely-inclined edges, as shown in Fig. 1. The shell 4 is provided at opposite sides with runner extensions 8, which are grooved, as shown at 9, to fit and slide upon the guides 7 as the shell is moved upward and downward by the stock 5.

Pivotally connected to the stock 5 at the point 10 is a hand-lever 11, and to said hand-lever is pivotally connected a link 12, the upper end of which is bent at an angle and inserted in a mortise in the lever and pivotally connected thereto at 13. The lower end of the link is provided with a fork, the arms 14 of which are pivotally mounted at 15 on the guides 7, as shown in Fig. 1. By the arrangement just described as the lever 11 is swung upward the stock 5 is pushed downward, thus forcing the shell 4 over the cone 2 and squeezing the lemon placed between the cone and shell, the juice escaping through the openings 6.

The stock 5 is provided at its upper end with a handle 16, by means of which the device as a whole is manipulated for mashing potatoes. When used for this purpose, the lever 11 is secured against one side of the stock 5 by means of a fastener 17, comprising a flat head, as shown in Fig. 1, which is receivable through a slot 18 in the expanded extremity 19 of the lever 11, the arrangement described permitting the lever to be secured to the handle or released therefrom when it becomes necessary to use the lever 11 in operating the lemon-squeezer.

Extending upward from the shell 4 is a rod 20, having one end secured to the shell and the other end deflected inward and secured to the stock 5. Mounted upon the rod 20 is an adjustable collar 21, which may be held at any point on the rod by means of a set-screw 22. The collar 21 is provided with an outwardly-extending cutter 23 for the purpose of opening a can. Secured to the shell 4 is a center pin 24, which extends outward from the rod 20, and in the operation of the device as a can-opener the pin 24 is driven through the center of the end of the can, after which the cutter 23 is driven through the top of the can adjacent to the outer edge thereof, after which the implement as a whole is turned upon the can, the cutter 23 serving to cut the tin top of the can adjacent to the outer edge thereof. The cutter 23 may be adjusted to any desired distance from the center pin 24, according to the size of the can being operated upon.

It will be apparent that the utensil hereinabove described is susceptible of considerable change in the form, proportion, and minor details of construction which may accordingly be resorted to without departing from the principle or sacrificing any of the advantages of the invention.

I claim—

1. A device of the class described comprising a base having upstanding guides, a squeezing-shell having runner extensions working up and down on said guides, a stock extending upward from the squeezing-shell, a lever pivotally connected to said stock, and a link interposed between said lever and guides, substantially as described.

2. A device of the class described comprising a solid base, a squeezing-shell movable toward and away from the base, a stock extending upward from the squeezing-shell, a lever pivotally connected to said stock, a link interposed between said lever and the base, and fastening means for securing the lever to the stock.

In testimony whereof I affix my signature in presence of two witnesses.

ALEXANDER C. POWERS.

Witnesses:
JOHN F. WILSMAN,
STEPHEN O. LEARY.